(12) United States Patent
Nakhjavani et al.

(10) Patent No.: US 9,875,323 B1
(45) Date of Patent: Jan. 23, 2018

(54) OPTIMIZATION OF FASTENER SELECTIONS

(71) Applicant: The Boeing Company, Chicago, IL (US)

(72) Inventors: Omid B. Nakhjavani, Mill Creek, WA (US); Kambiz Aubon, Houston, TX (US)

(73) Assignee: THE BOEING COMPANY, Chicago, IL (US)

( * ) Notice: Subject to any disclaimer, the term of this patent is extended or adjusted under 35 U.S.C. 154(b) by 648 days.

(21) Appl. No.: 14/470,185

(22) Filed: Aug. 27, 2014

(51) Int. Cl.
*G06F 17/50* (2006.01)

(52) U.S. Cl.
CPC .............................. *G06F 17/5004* (2013.01)

(58) Field of Classification Search
None
See application file for complete search history.

(56) References Cited

U.S. PATENT DOCUMENTS

| | | | |
|---|---|---|---|
| 2007/0011496 A1* | 1/2007 | Ahmad | G06F 17/50 714/39 |
| 2010/0114536 A1* | 5/2010 | Hollingshead | G06F 17/5004 703/1 |
| 2015/0277432 A1* | 10/2015 | Ikeda | B21J 15/28 700/97 |

* cited by examiner

*Primary Examiner* — Craig Dorais
(74) *Attorney, Agent, or Firm* — MH2 Technology Law Group LLP

(57) ABSTRACT

An apparatus and method for a computer implemented tool for designing fasteners to satisfy design rules and optimize the engagement between the locking insert of the bolt and the insert threads to achieve the best solution which has maximum engagement or friction, minimum vibration and weight.

30 Claims, 8 Drawing Sheets

USING TYPE L

| BOLT ENGAGEMENT FOR UPPER UMBILICAL-PHMA OPTION 2 | | | | UPPER UMBILICAL (OPTION 2) | EQUIVALENT OF MIN # OF THREADS |
|---|---|---|---|---|---|
| UPPER UMBILICAL PHMA OPTION 2 | NOM | MAX | MIN | | |
| | | | | MAX | MIN | | |
| XXXXXXXXX | BOLT LENGTH | 0.750 | 0.750 | 0.720 | 0.472 | 0.433 | HOLE DEPTH | 12.12 |
| XXXXXXXXX | WASHER THICKNESS | 0.063 | 0.069 | 0.057 | 0.391 | 0.327 | BOLT PROTRUSION IN HOLE | 9.16 |
| XXXXXXXXX | INSERT | 0.315 | 0.325 | 0.305 | 0.325 | 0.305 | INSERT LENGTH | 8.54 |
| XXXXXXXXX | FLANGE THICKNESS | 0.250 | 0.255 | 0.245 | 0.255 | 0.215 | INSERT THREADED LENGTH | 6.02 |
| XXXXXXXXX | HOLE DEPTH | 0.413 | 0.472 | 0.433 | 0.086 | 0.002 | BOLT PROTRUSION OUT OF INSERT (IN) | 0.06 |
| XXXXXXXXX | WASHER THICKNESS | 0.063 | 0.069 | 0.057 | 2.41 | 0.06 | BOLT PROTRUSION OUT OF INSERT (THREADS) | |
| | | | | 6.5 | 6.5 | NUMBER OF THREADS [5 MINIMUM] | GROOVE CUT FROM THE BOLT TIP (IN) |
| | | MIN BOLT LENGTH | 0.720 | 0.071 | 0.089 | | STARTS |
| MAX BOLT LENGTH | 0.750 | MAX WASHER THICKNESS | 0.069 | 0.232 | 0.232 | | LOCKING INSERT LENGTH |
| MIN WASHER THICKNESS | 0.057 | MAX FLANGE THICKNESS | 0.255 | 0.304 | 0.304 | | ENDS |
| MIN FLANGE THICKNESS | 0.245 | MAX WASHER THICKNESS | 0.069 | 0.232 | 0.166 | | LOCKING INSERT THREADED LENGTH ENGAGED (IN) |
| MIN WASHER THICKNESS | 0.057 | MIN BOLT PROTRUSION | 0.327 | 100.0% | 71.3% | 28.7% | LOCKING INSERT THREADED LENGTH ENGAGED (%) |
| MAX BOLT PROTRUSION | 0.391 | | | 0.087 | 0.023 | 0.66 | GAP BETWEEN GROOVE'S END & HOLE'S TOP |
| VOID DEPTH | | 0.145 | 0.042 | 0.145 | 0.042 | HOLE DEPTH-BOLT PROTRUSION | NEGATIVE VALUE = BOLT BOTTOMING-OUT |

OPTIMIZATION OF FASTENER SELECTIONS

BACKGROUND

Field

This invention relates generally to fasteners and, more particularly, to methods for selecting fasteners.

Background

Fasteners account for a significant amount of parts in aircraft and automobiles and directly affect strength characteristics and weight of the structural assemblies. For instance, it has been reported that some large commercial aircraft include over six million parts, half of which are fasteners. As the manufacturing industry for such vehicles and other manufactured systems of similar complexity evolve to incorporate newer, more exotic materials, fasteners will continue to figure prominently in the manufacturing and assembly processes. Fasteners play a critical role in defining the longevity, structural integrity, and design philosophy of most metallic and composite aircraft structures.

Improvements in technology have provided increased opportunity to automate production processes including; drilling, installation and verification. However, existing tolerance calculation and fastener selection tools do not suggest the best combination of certain fastener components in order to achieve the maximum engagement between the locking insert of the bolt and the insert threads. In order to reduce vibration and increase fastener life time, a fastener selection method is needed that enables the designers to quickly and visually determine the best combination of fasteners components that maximizes the locking effect of the bolts with locking insert. Given the number and types of fasteners, a system or method doesn't exist that allows a user to quickly identify the best fastener and insert combination in order to minimize vibration and improve structural integrity. Current systems and methods do not allow the user to quickly narrow the list of fasteners down to the best combinations.

SUMMARY

The invention is a valuable and useful tool for designing fasteners to satisfy design rules and optimize the engagement between the locking insert of the bolt and the insert threads to achieve the best solution which has maximum engagement or friction, minimum vibration and weight. This invention can be utilized in aerospace and automotive industries with highly accurate tolerance configurations. A method for selection of a fastener can be implemented by a computer comprising a processor and a non-volatile memory storing encoded instructions where when said instructions are executed by the processor can be operable to cause the computer to perform the process of receiving at a computer system fastener data for a plurality of fasteners where the fastener data for each of the plurality of fasteners includes one or more of a fastener length, a flange thickness, and a start dimension and an end dimension for a fastener locking insert where the start dimension and end dimension is with respect to a leading end of each fastener for optimization of the position of the fastener locking insert.

The fastener data can be received from a database of fastener data including various fastener specs along with nominal design specs and the design tolerance specs. The hole through which the fastener is inserted may require an insert. Another step in the process is receiving at the computer system hole depth data, which is indicative of the size insert and fastener that is required. Based on the hole depth data, the system can perform the step of receiving at the computer system hole insert data for a plurality of hole inserts where the hole insert data for each of the plurality of hole inserts includes data representative of one or more of an insert length and an insert threaded length.

The insert data in combination with the fastener data can be utilized for determining a percentage overlap between the fastener locking insert and the hole insert threaded length and determining a percentage extension beyond the insert threaded length of the fastener locking insert for each combination of fastener and hole insert when the fastener if fully screwed into the hole insert. In order to reduce the impact of vibration on the components, the system can perform the step of selecting an optimum fastener and an optimum hole insert combination that provides a greatest percentage overlap and a lowest percentage of the extension beyond the insert length resulting in a fastener and hole insert combination, which improves vibration characteristics to minimize susceptibility to vibration.

However, when selecting the best fasteners there may be design parameters and/or design constraints that rule out the use of certain fasteners and/or inserts thereby reducing the number of items to choose from. Therefore, in one implementation of the technology, the system performs the steps of receiving at the computer system design parameter data for a specific application where the design parameter data includes one or more of a material type, a tensile strength, and a number of threads per pitch and receiving at the computer system material property data for the plurality of fasteners and the plurality of hole inserts where the material property data includes one or more of tensile strength, coating, and heat treatment. Based on the constraints, the system performs the step of removing a portion of the plurality of fasteners and of the plurality of hole inserts based on not meeting the constraints imposed by one or more of the design parameter data and the material property data, and restricting the step of selecting the optimum fastener to selecting the optimum fastener from only a remaining portion of the plurality of fasteners.

In one implementation of the technology, the method of selecting the optimum fastener and the optimum hole insert combination can include the step of implementing one or more global optimization techniques in parallel and converging to no more than a predetermined set of best fastener and hole insert combinations, which meet one or more of the design parameter data and the material property data constraints. The method of selecting can also include implementing a local optimization technique on the predetermined set of best fastener and hole insert combinations and determining a global minimum.

The step of selecting an optimum fastener and an optimum hole insert combination that provides a greatest percentage overlap and a lowest percentage of the extension beyond the insert length includes receiving at a computer and considering washer thickness data for a plurality of washers used in combination with each of the plurality of fasteners. In one implementation of the technology, fasteners can be removed from the inventory due to constraints by performing the method including the step of flagging fasteners and hole inserts for removal from inventory based on not meeting the design parameter data and the material property data constraints. The method, can further include the step of outputting a list of the predetermined set of the best fastener and hole insert combinations and the global minimum to a medium readable by a human user.

By reducing vibration, there is an increase in fastener life-time, therefore, the proposed method enables the designers to quickly and visually determine the best combination of fasteners components that maximizes the locking effect of the bolts with locking insert. This tool uses knowledge based engineering, design rules and variety optimization methods to converge in the best solution which has maximum engagement or friction, minimum vibration and optimal weight.

This invention will be highly valuable for designing fasteners to satisfy design rules and optimize the engagement between the locking insert of the bolt and the insert threads to achieve the best solution which has maximum engagement or friction, minimum vibration and weight. This invention will be tremendously valuable in aerospace industries with highly accurate tolerance configurations because optimal fastener selection is not feasible given the number of components and combinations.

The system and method of selecting a fastener for minimizing vibration, includes receiving a thread length and fastener length for a plurality of fasteners, and a threaded insert length. The method determines a percentage of intersection/overlap between the threaded insert and the threaded portion of each fastener, and a percentage of the threaded portion of each fastener that extends beyond the threaded insert, and selects the fastener that provides the greatest percentage of intersection/overlap and the lowest percentage of thread extension beyond the threaded insert, to minimize the vibration caused by the cantilevered fastener threads extending beyond the insert. The technology as disclosed and claimed herein solves the problem of selecting the best fastener by enabling a designers to quickly and visually determine the best combination of fasteners components that maximizes the locking effect with locking insert while minimizing vibration and increasing fastener life. With the technology as disclosed and claimed herein the users will be able to change certain values and see the results in both numbers and positions of pertinent components visually. Hence the designer can easily determine the best selection of fasteners components for design to satisfy design rules and constraints.

The user can also over time eliminate the types of fasteners that are purchased and/or maintained in inventory as information is accumulated for the best fasteners and insert for a given product line.

The features, functions, and advantages that have been discussed can be achieved independently in various embodiments or may be combined in yet other embodiments further details of which can be seen with reference to the following description and drawings.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 4F is an illustration of tolerance data;

Figure 1:
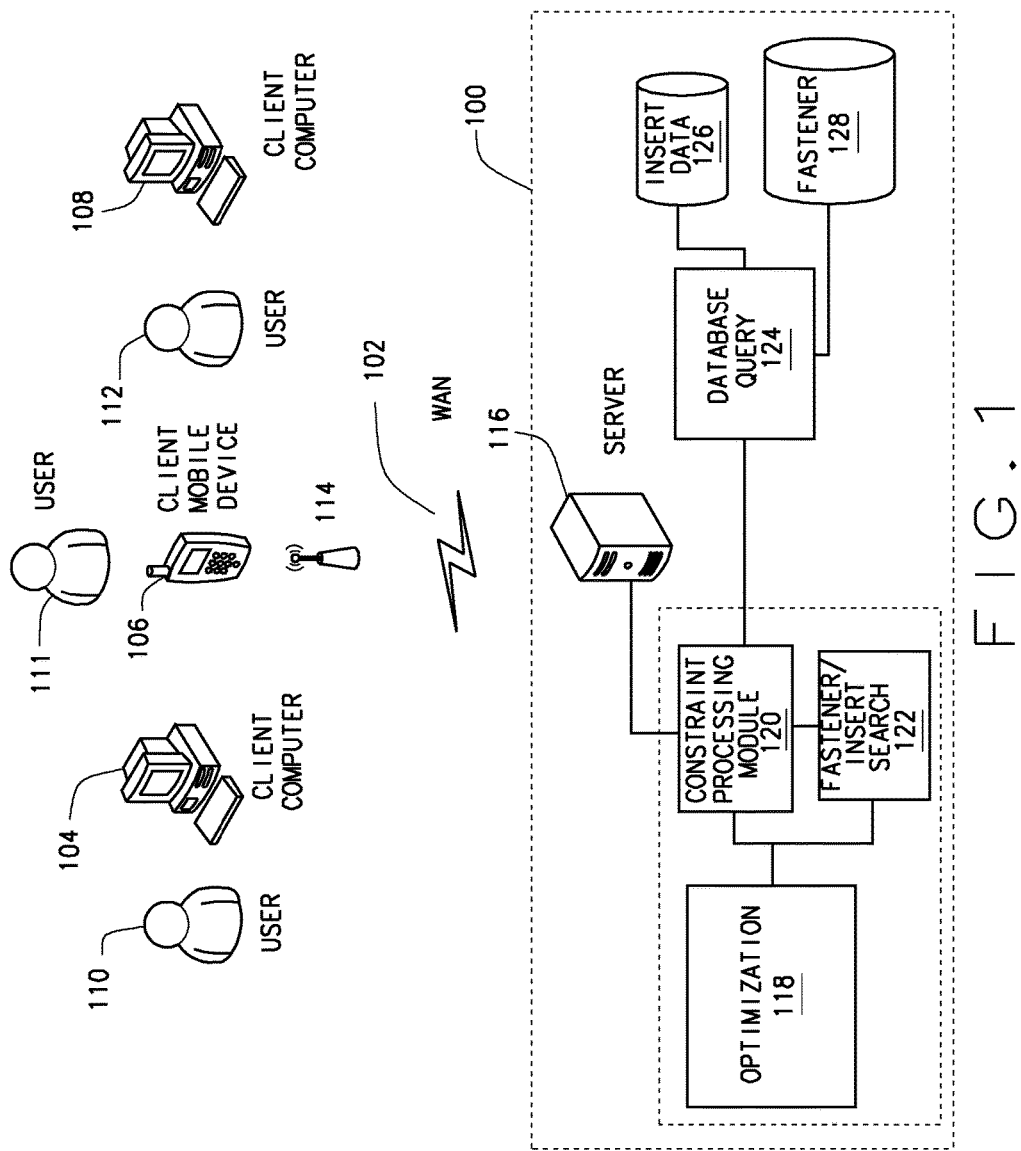
FIG. 1 is an illustration of a client server environment implementing the fastener selection system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DESCRIPTION

According to the embodiment(s) of the present invention, various views are illustrated in FIG. 1-6 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present invention comprising a system and method for choosing the best fastener teaches a novel apparatus and method for selecting a fastener.

The details of the invention and various embodiments can be better understood by referring to the figures of the drawing. Referring to FIG. 1, one implementation of the system is shown using a client-server environment. A user 110, 111 and 112 can access the computer implemented tool through a client computer work station 110 and 108 or other client computing device such as a client mobile device 106. The users can access the server environment via a wide area network or a local area network. The computing system 100 can include a server 116 or other computing device accessible via a network.

Within the server function or other computing function, included is an optimization module 118, which performs the optimization process to select the best fastener after the fastener and insert search module 122 have located potential components and the constraint module 120 has eliminated certain potential components as needed based on design parameters and constraints. A database query function 124 can retrieve insert data 126 and fastener data 128 based on the hole size and application.

The computer system 100 and client computers 104, 106, and 108 can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system 100 and client computing devices 104, 106 and 108 also can include an alphanumeric input device (e.g., a keyboard), a cursor control device (e.g., a mouse), a drive unit, a signal generation device (e.g., a speaker) and a network interface device.

Figure 2:
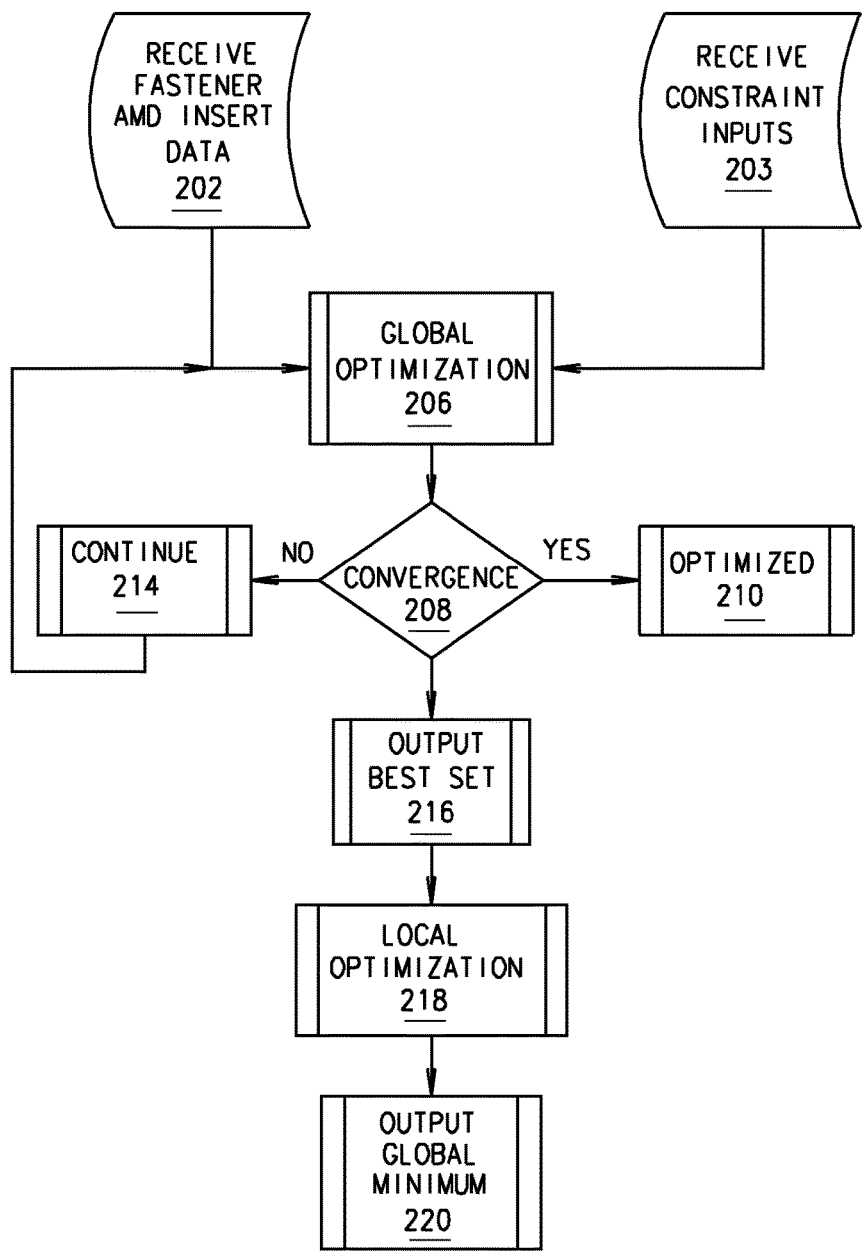
FIG. 2 is an illustration of the process for selecting a best fastener.
Figure 3:
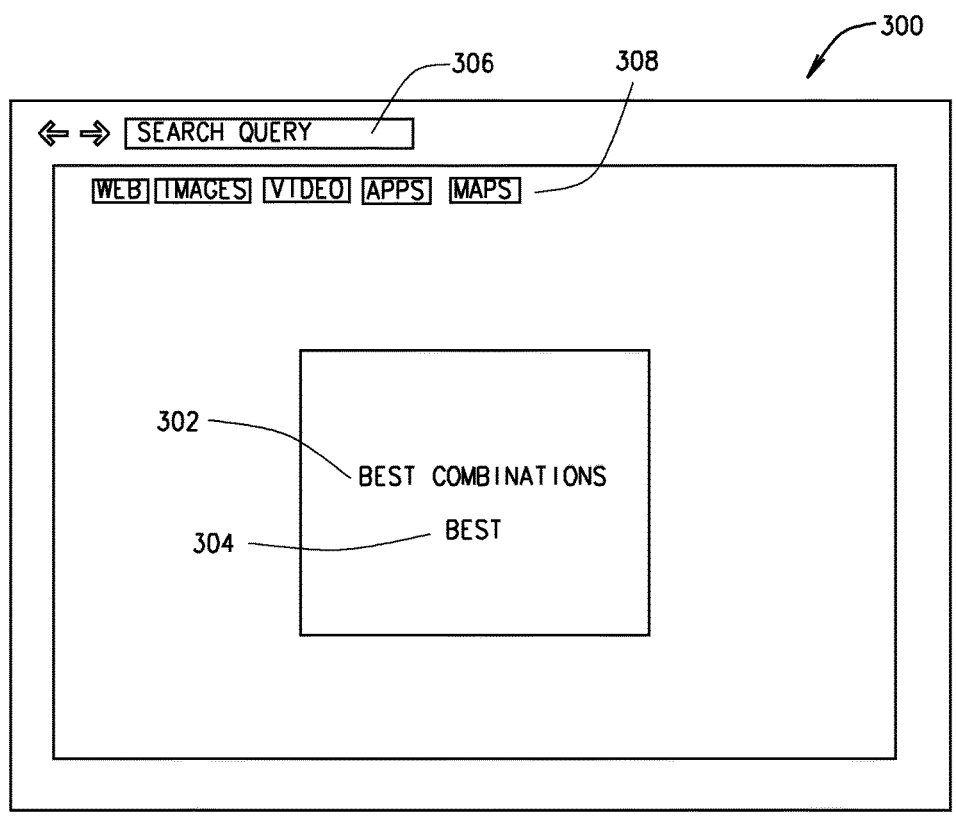
FIG. 3 is an illustration of a user interface.

Referring to FIGS. 1 and 2, a method for selection of a fastener can be implemented by a computer comprising a processor and a non-volatile memory storing encoded instructions where when said instructions are executed by the processor are operable to cause the computer to perform the process of receiving at a computer system fastener data 202 for a plurality of fasteners where the fastener data for each of the plurality of fasteners includes one or more of a fastener length, a flange thickness, and a start dimension and an end dimension for a fastener locking insert where the start dimension and end dimension is with respect to a leading end of each fastener for optimization of the position of the fastener locking insert. The computer system can also perform the step of receiving at the computer system hole depth data and receiving at the computer system hole insert data for a plurality of hole inserts where the hole insert data for each of the plurality of hole inserts includes one or more of an insert length and an insert threaded length.

In one implementation of the invention, the process can include utilizing global optimization 206 for converging 208 to the optimized 210 solution. The optimization module performs the step of determining a percentage overlap between the fastener locking insert and the hole insert threaded length and determining a percentage extension beyond the insert threaded length of the fastener locking insert for each combination of fastener and hole insert when the fastener if fully screwed into the hole insert. The best is determined by selecting an optimum fastener and an optimum hole insert combination 218 that provides a greatest percentage overlap and a lowest percentage of the extension beyond the insert length resulting in a fastener and hole insert combination that improves vibration characteristics to minimize susceptibility to vibration. The optimization can initially converge to a best set of candidates 216, and when a local optimization 218 is performed the global best 220 can be provided.

One implementation of the method can further perform the steps of receiving at the computer system design parameter data for a specific application where the design parameter data includes one or more of a material type, a tensile strength, and a number of threads per pitch and receiving at the computer system material property data for the plurality of fasteners and the plurality of hole inserts where the material property data includes one or more of tensile strength, coating, and heat treatment. In order to address design constraints and parameters, the computer implemented method can further perform removing a portion of the plurality of fasteners and of the plurality of hole inserts from the possible items based on not meeting the constraints of one or more of the design parameter data and the material property data, and restricting the step of selecting the optimum fastener to selecting the optimum fastener from only a remaining portion of the plurality of fasteners.

One implementation of the technology can include the step of implementing one or more global optimization techniques in parallel and converging to no more than a predetermined set of best fastener and hole insert combinations, which meet one or more of the design parameter data and the material property data constraints. Yet a further step can be performed implementing a local optimization technique on the predetermined set of best fastener and hole insert combinations and determining a global minimum or best solution. The step of selecting an optimum fastener and an optimum hole insert combination provides a greatest percentage overlap and a lowest percentage of the extension beyond the insert length can include receiving at a computer and considering washer thickness data for a plurality of washers used in combination with each of the plurality of fasteners.

In one implementation of the technology, in order to remove a portion of the fasteners from the items to select from, a step of flagging fasteners and hole inserts for removal from inventory based on not meeting the design parameter data and the material property data constraints can be performed. Upon completion of the optimization, a step of outputting a list of the predetermined set of best fastener and hole insert combinations 302 and the global minimum 304 can be presented to a medium readable by a human user—refer to the user interface illustrated in FIG. 3, which can be presented on a display of a computer. The user interface 300 as illustrated can be provided in a browser environment and a search tool 306 can be provided as well as various menu selections 308. The user interface can be presented on a computer display.

One implementation of the technology includes a computer system for selection of an optimum fastener where the computer having a memory and one or more processors and one or more programs, stored in the memory and executed by the one or more processors, where the one or more programs include, instructions for receiving at a computer system fastener data for a plurality of fasteners where the fastener data for each of the plurality of fasteners includes one or more of a fastener length, a flange thickness, and a start dimension and an end dimension for a fastener locking insert where the start dimension and end dimension is with respect to a leading end of each fastener for optimization of the position of the fastener locking insert. The system can also have instructions for receiving at the computer system hole depth data.

In one implementation of the computing system, the computer system or machine can operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine or computer system designed for optimizing fastener selection may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

Certain systems, apparatus, applications or processes can be described as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. As described herein the modules can be present as executable instructions for optimization of fastener selection. The inventive subject matter may be represented in a variety of different implementations of which there are many possible permutations including implementation of optimization using hardware, firmware, software or a combination thereof.

The computing system can operate to retrieve hole insert data by executing instructions for receiving at the computer system hole insert data for a plurality of hole inserts where the hole insert data for each of the plurality of hole inserts includes one or more of an insert length and an insert threaded length. The computing system can further operate to determine a percentage overlap by executing instructions for determining a percentage overlap between the fastener locking insert and the hole insert threaded length and determining a percentage extension beyond the insert threaded length of the fastener locking insert for each combination of fastener and hole insert when the fastener if fully screwed into the hole insert. The instructions for selecting an optimum fastener and an optimum hole insert combination can also be executed that provides a greatest percentage overlap and a lowest percentage of the extension beyond the insert length resulting in a fastener and hole insert combination that improves vibration characteristics to minimize susceptibility to vibration.

The computer can also execute instructions for receiving at the computer system design parameter data for a specific application where the design parameter data includes one or more of a material type, a tensile strength, and a number of threads per pitch in order to rule out certain items based on constraints. In order to determine what items to exclude based on constraints and design parameters, the computer system can execute instructions for receiving at the computer system material property data for the plurality of fasteners and the plurality of hole inserts where the material property data includes one or more of tensile strength, coating, and heat treatment, and instructions for removing a portion of the plurality of fasteners and of the plurality of hole inserts based on not meeting the constraints of one or more of the design parameter data and the material property data, and restricting the step of selecting the optimum fastener to selecting the optimum fastener from only a remaining portion of the plurality of fasteners. Also, instructions for flagging fasteners and hole inserts for removal from inventory based on not meeting the design parameter data and the material property data constraint can be included.

As part of the computing system instructions for selecting the optimum fastener and the optimum hole insert combination includes, there can be additional instructions, which include instructions for implementing one or more global optimization techniques in parallel and converging to no more than a predetermined set of best fastener and hole insert combinations, which meet one or more of the design parameter data and the material property data constraints. There can also be further instructions for determining the best fastener by including instructions for implementing a local optimization technique on the predetermined set of best fastener and hole insert combinations and determining a global minimum. For a user interface the computing system can include instructions for outputting a list of the predetermined set of best fastener and hole insert combinations and the global minimum to a medium readable by a human user.

Also included in the instructions of the computing system for selecting an optimum fastener and an optimum hole insert combination that provides a greatest percentage overlap and a lowest percentage of the extension beyond the insert length can be instructions for receiving at a computer and considering washer thickness data for a plurality of washers used in combination with each of the plurality of fasteners.

The methods performed by the computer executable instructions for optimization of fastener selection as described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed implementation of fastener optimization. Thus, the following claims are hereby incorporated into the Detailed Description, with each claim standing on its own as a separate embodiment.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media. The instructions for optimizing fastner selection as described here in can be electronically stored on computer readable medium.

The computer system 100 can be communicably linked over a local area network or a wide area network via wireless connectivity of wired connectivity. The computer system can include a server function having a processor and memory and various modules including an optimization module 118, a constraint processing module 120 and a Fastener/Insert search module. The modules can comprise machine executable code or firmware in combination with a processor or logic implemented by electronic hardware.

The technology could be implemented on a non-transitory computer readable storage medium for use in conjunction with a computer system, where the computer readable storage medium can be operable for storing one or more programs including instructions for execution by the computer system, such that when the one or more programs are executed by the computer system can cause the computer system to perform operations including receiving at a computer system fastener data for a plurality of fasteners where the fastener data for each of the plurality of fasteners includes one or more of a fastener length, a flange thickness, and a start dimension and an end dimension for a fastener locking insert where the start dimension and end dimension is with respect to a leading end of each fastener for optimization of the position of the fastener locking, and receiving at the computer system hole insert data for a plurality of hole inserts where the hole insert data for each of the plurality of hole inserts includes one or more of an insert length and an insert threaded length, in order to determine a percentage overlap between the fastener locking insert and the hole insert threaded length and determining a percentage extension beyond the insert threaded length of the fastener locking insert for each combination of fastener and hole insert when the fastener if fully screwed into the hole insert.

The instructions can include instructions for selecting an optimum fastener and an optimum hole insert combination that provides a greatest percentage overlap and a lowest percentage of the extension beyond the insert length resulting in a fastener and hole insert combination that improves vibration characteristics to minimize susceptibility to vibration.

Referring to FIG. 4, an illustration of an example of a fastener selection using data relating to the fastener and the insert is shown. FIG. 4A is an illustration of a fastener 402 and an insert 406 and washer 404 being utilized to attach two members 407 and 408. Referring to FIG. 4F, an illustrative example of fastener specification and tolerance data is provided representative of the type and format of data electronically stored and accessible by the system. Also corresponding hole depth data is shown, which are representative of the hole depths and sizes for which the fastener was designed. Also, corresponding insert data and tolerances is illustrated. FIGS. 4C and 4D illustrate the thread area 410 of the fastener and highlights the locking insert 412, which can be constructed of an elastomeric material or other appropriate material. FIG. 4E is a further illustration of the fastener and insert interface. FIG. 4G illustrates a tabular analysis 430 of the fastener to determine the best fastener interface with the insert.

Figure 4A:
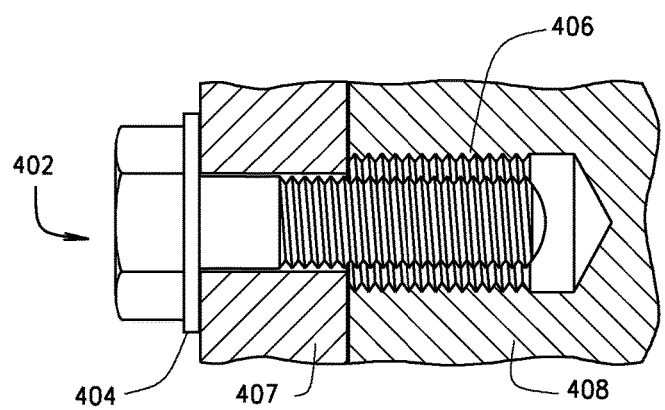
FIG. 4A is an illustration of a sectional view of a fastener and insert interface.
Figure 4B:
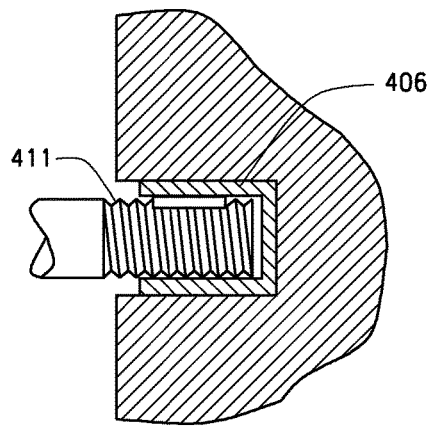
FIG. 4B is an illustration of a sectional view of a fastener and insert interface highlighting the locking insert.
Figure 4C:
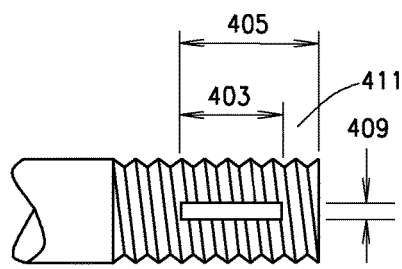
FIG. 4C is a view of the thread portion of the fastener and locking insert.
Figure 4D:
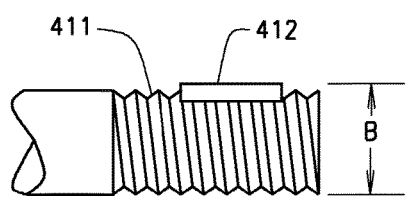
FIG. 4D is a view of the thread portion of the fastener and locking insert.
Figure 4E:
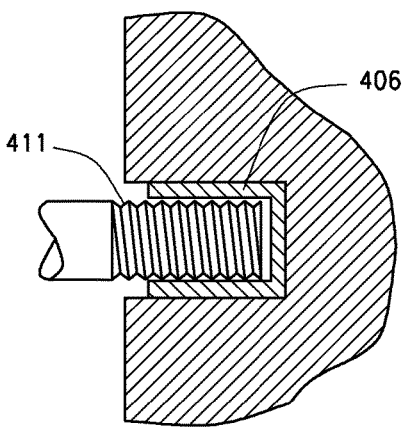
FIG. 4E is an illustration of a sectional view of a fastener and insert interface.
Figure 4G:
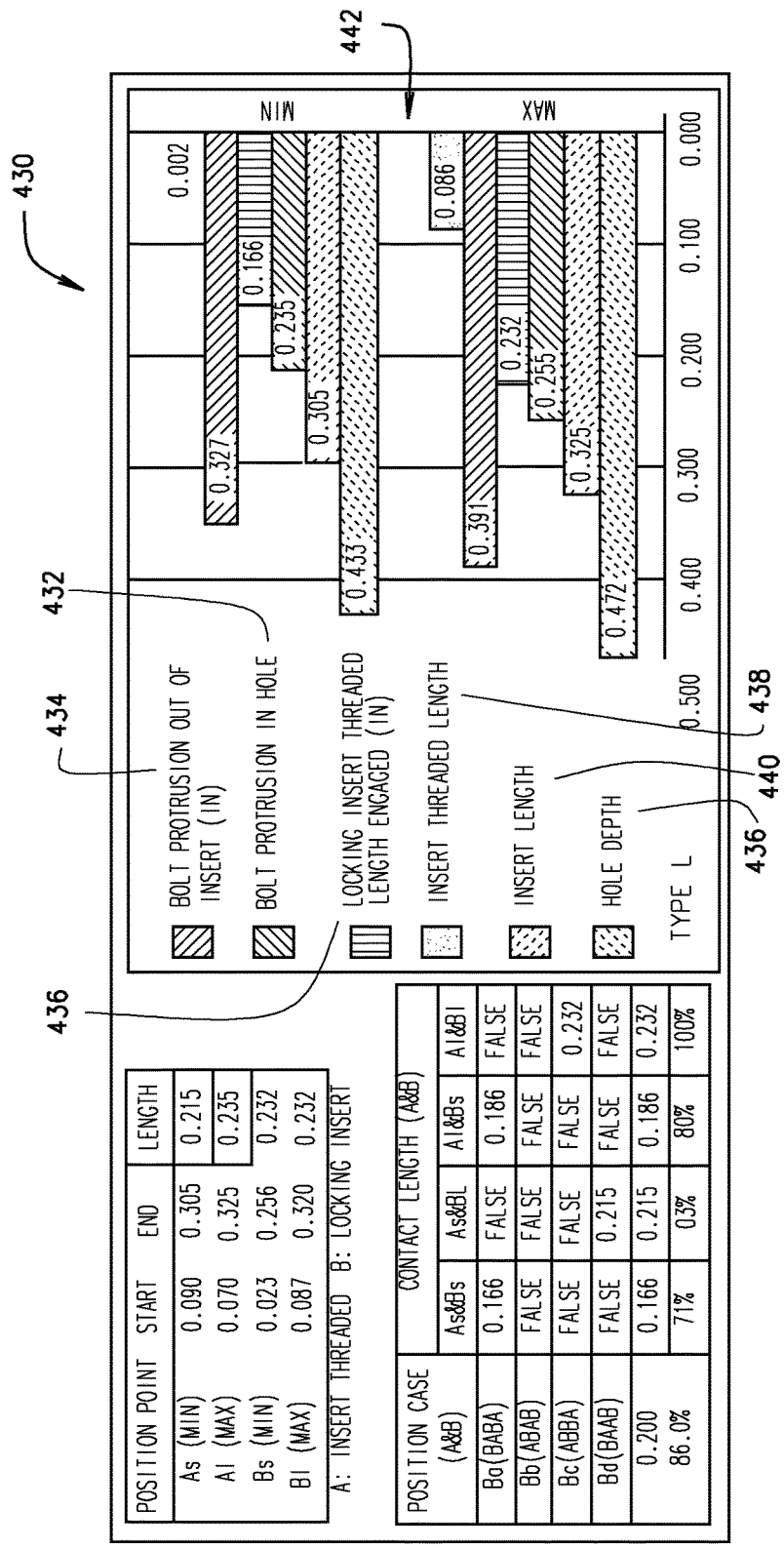
FIG. 4G is an illustration of optimization data.
Figure 4H:
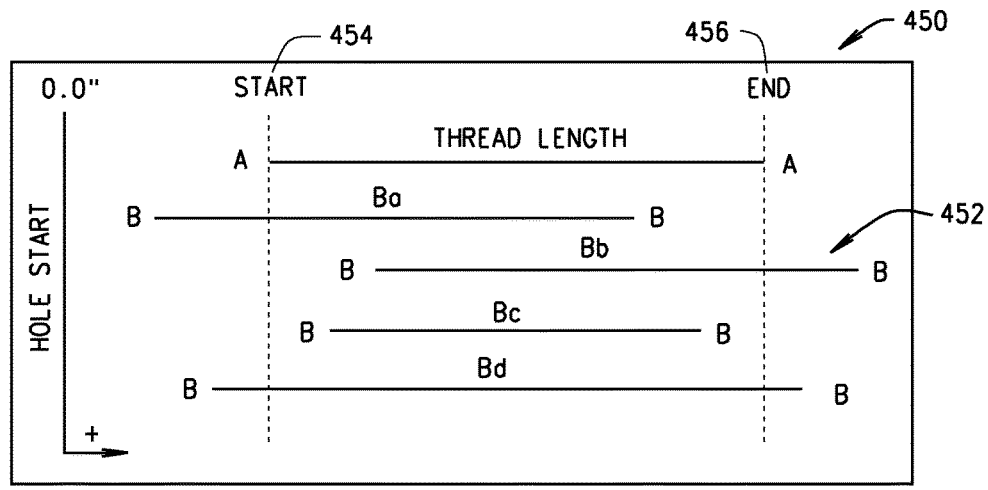
FIG. 4H is an illustration of locking insert overlap.
Figure 6:
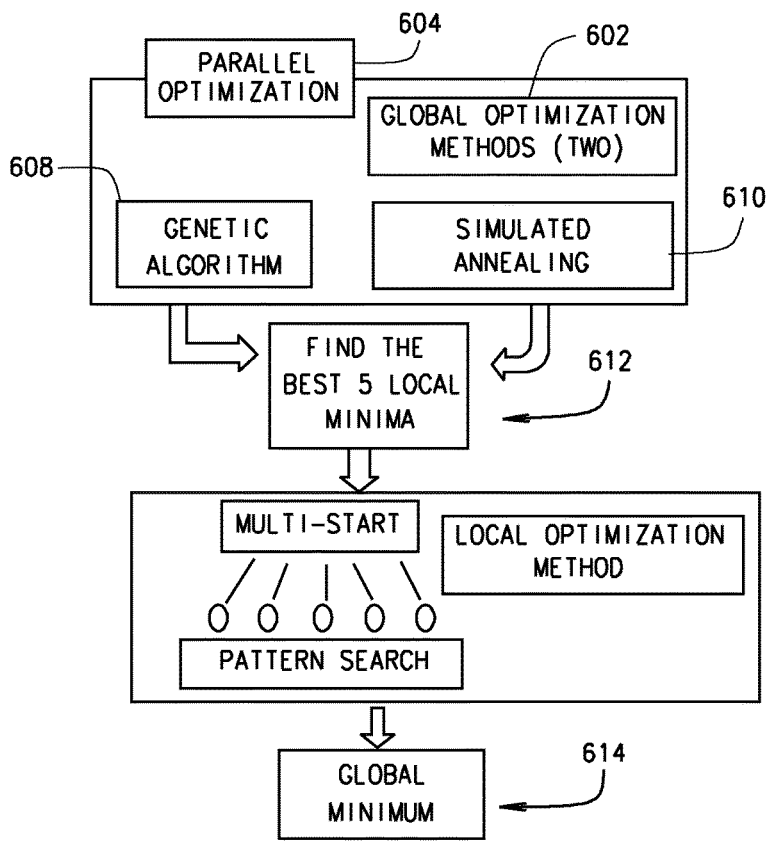
FIG. 6 is an illustration of the flow for the optimization technique.

Various data is evaluated including fastener protrusion out of the insert 434, bolt protrusion in the hole 432, locking insert engagement 436, insert thread length 438, insert length 440 and hole depth 436. FIG. 4H illustrates the various percent overlaps between the locking insert and the thread length. The thread length start 454 and end 456 is graphically illustrated 450. The amount of engagement is illustrated by the horizontal lines 452. A graphical representation of an analysis 442 to select the best fastener as shown in FIGS. 4G and 4H can be provided or displayed to a user using a display system. The length 403 and the width 409 of the locking insert 412 is shown in FIG. 4C. The start dimension 405 of the locking insert is shown with respect to the leading end of the fastener and the end dimension 411 of the locking insert is also shown with respect to the leading end of the fastener. FIGS. 4B, 4B and 4E do not illustrate the thread details of the insert in order to more clearly illustrate the locking insert 412.

Figure 5:
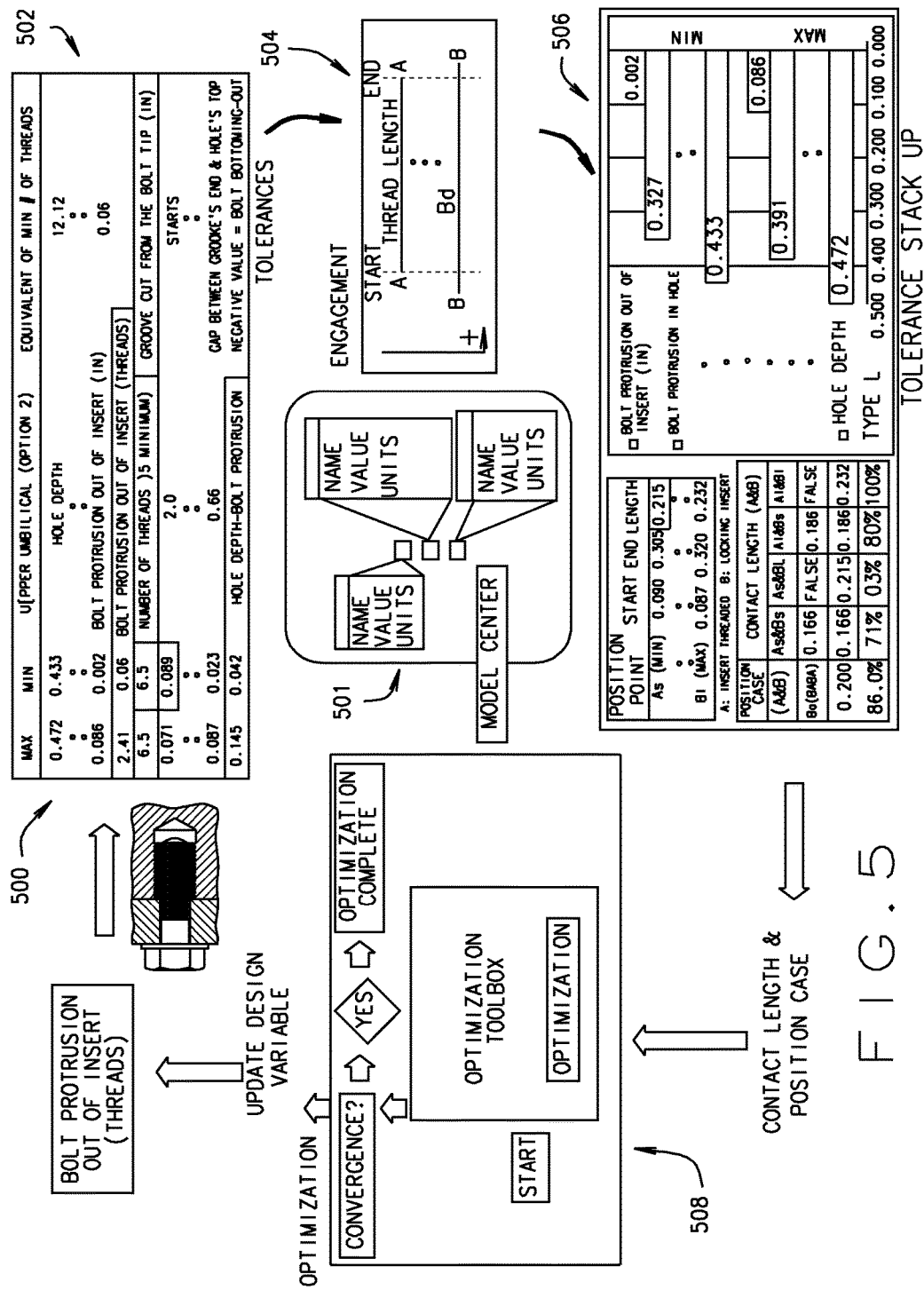
FIG. 5 is an illustration of the model for selecting a fastener.

Referring to FIG. 5, an illustration of the system flow is shown. Fastener and insert data 501 can be extracted from the data on the various fastener models based on hole depth. The specification and tolerances for matching fasteners and inserts can be evaluated and various parameters relating to the fastener and insert interface can be assessed 502. The types of tolerances and specification that are evaluated are further illustrated in FIG. 4F. Nominal 462, maximum 464 and minimum 468 tolerances can be evaluated. Optimization of the fastener and insert is performed to maximize the interference or engagement 504 between the locking insert 412 and the hole insert 406. A tolerance analysis 506 is performed to determine which fasteners are optimal. The optimization 508 can converge to the top fasteners having the most interference and other design parameters and constraints are best matched. For example, the top five fastener and insert combinations can be determined having interferences between the locking insert and the hole insert ranging from 75% interference to 100% interference after considering all of the various tolerance stack-ups.

However, the other design parameters and constraints may vary for each fastener. Therefore, although a fastener may have 100% interference between the locking insert and the hole insert, it may not fair as well for a design parameter relating to bolt protrusion out of the hole insert. Therefore, as indicated, the top local minima can be determined from the global optimization ranging from 75% to 100% and for example these top 5 (or other top quantity) can be presented to the user as options. A local optimization can be performed on the top local minima and a best fastener of global minimum can be determined and presented to the user—See FIG. 6.

A numerical analysis is performed by the system that performs optimization of a function for maximizing interference between the locking insert and the hole insert according to the tolerance criteria. Also a set of bound and more general constraints can also present, for example the design parameters or design constraints, and the decision variables can be optimized considering also the constraints. To perform global optimization 602, parallel optimization 604 techniques can be used, for example genetic 608 and simulated 610 algorithms. A genetic algorithm, can examine a population of candidate fastener solutions as an optimization problem, which is evolved toward better solutions iteratively. Each candidate solution has a set of properties or fastener/insert specifications.

The evolution usually starts from a population of known fasteners whose information is stored in a database, and the optimization is performed as an iterative process, with the population in each iteration called a generation. In each generation, the fitness of every individual in the population is evaluated; the fitness is the value of the objective function in the optimization problem being solved, in this case maximizing the interference between the locking insert and the hole insert. Also by way of example the parallel process can be simulated annealing, which is a generic probabilistic metaheuristic for global optimization which locates a good approximation to the global optimum of the search function of maximizing the interference. Parallel optimization can be utilized to find the top 612 fasteners and insert combination for the hole size. Local optimization can then be performed to find the local minimum 614.

The various implementations and examples shown above illustrate a method and system for selection of a fastener. A user of the present method and system may choose any of the above implementations, or an equivalent thereof, depending upon the desired application. In this regard, it is recognized that various forms of the subject fastener selection method and system could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

The drive unit includes a computer-readable storage medium on which is stored one or more sets of instructions (e.g., software, programs) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The various fastener selection examples shown above illustrate a system and method for fastener selection. A user of the present invention may choose any of the above implementations, or an equivalent thereof, depending upon the desired application. In this regard, it is recognized that various forms of the subject fastener selection system could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method comprising:
   executing, with a processor of a computer, computer executable instructions stored on a memory of the computer causing the computer to perform the process of:
   determining a percentage overlap between a fastener locking insert and an insert threaded length for each combination of a plurality of fasteners and a plurality of hole inserts,
   selecting an optimum fastener and an optimum hole insert combination that provides a greatest percentage overlap, and
   physically attaching two members together using the optimum fastener and the optimum hole insert combination.

2. The method as recited in claim 1, further comprising:
   receiving, at the computer, fastener data for the plurality of fasteners where the fastener data for each of the plurality of fasteners includes data for one or more of a fastener length, a flange thickness and a start dimension for the fastener locking insert and an end dimension for the fastener locking insert where the start dimension and the end dimension are with respect to a leading end of each fastener; and
   receiving, at the computer, hole insert data for the plurality of hole inserts where the hole insert data for each of the plurality of hole inserts includes one or more of an insert length and the insert threaded length.

3. The method as recited in claim 2, further comprising:
   receiving, at the computer, hole depth data, where the fastener data and the hole insert received is dimensionally compatible with the hole depth data.

4. The method as recited in claim 2, further comprising:
   determining a percentage extension of the locking insert beyond the insert threaded length, and where selecting the optimum fastener and the optimum hole insert combination also provides a lowest percentage of the extension beyond the insert length of the locking insert when each of the plurality of fasteners is fully screwed into one of the plurality of hole inserts for the optimum fastener and the optimum hole insert combination that improves vibration characteristics to minimize susceptibility to vibration.

5. The method as recited in claim 2, further comprising:
   receiving, at the computer, design parameter data for a specific application where the design parameter data includes one or more of a material type, a tensile strength, and a number of threads per pitch;
   receiving, at the computer, material property data for the plurality of fasteners and the plurality of hole inserts where the material property data includes one or more of tensile strength, coating, and heat treatment; and
   removing a portion of the plurality of fasteners and a portion of the plurality of hole inserts based on not meeting a constraint of one or more of the design parameter data and the material property data, and restricting the selecting the optimum fastener to selecting the optimum fastener from only a remaining portion of the plurality of fasteners.

6. The method as recited in claim 2, where selecting the optimum fastener and the optimum hole insert combination includes:
   implementing one or more global optimization techniques in parallel and converging to no more than a predetermined set of best fastener and hole insert combinations, which meet the constraint of one or more of the design parameter data and the material property data.

7. The method as recited in claim 6, further comprising:
   implementing a local optimization technique on the predetermined set of best fastener and hole insert combinations and determining a global minimum.

8. The method as recited in claim 7, where selecting the optimum fastener and the optimum hole insert combination that provides the greatest percentage overlap and the lowest percentage of the extension beyond the insert length of the locking insert includes receiving, at the computer, washer thickness data for a plurality of washers used in combination with each of the plurality of fasteners when selecting the optimum fastener and the optimum hole insert combination.

9. The method as recited in claim 8, further comprising:
   flagging fasteners and hole inserts for removal from inventory based on not meeting the constraint of one or more of design parameter data and the material property data.

10. The method as recited in claim 9, further comprising:
    outputting a list of the predetermined set of best fastener and hole insert combinations and the global minimum to a medium readable by a human user.

11. A computer system comprising:
    a computer having a memory and one or more processors;
    one or more programs, stored in the memory and executable by the one or more processors, where the one or more programs include instructions for causing the computer to perform various processes when executed where the instructions include:
    determining a percentage overlap between a fastener locking insert and an insert threaded length for each combination of a plurality of fasteners and a plurality of hole inserts,
    selecting an optimum fastener and an optimum hole insert combination that provides a greatest percentage overlap, and
    causing two members to be attached together using the optimum fastener and the optimum hole insert combination.

12. The computer system as recited in claim 11, where the instructions further include:
    receiving, at the computer, fastener data for the plurality of fasteners where the fastener data for each of the plurality of fasteners includes data for one or more of a fastener length, a flange thickness and a start dimension for the fastener locking insert and an end dimension for the fastener locking insert where the start dimension and the end dimension are with respect to a leading end of each fastener; and receiving, at the computer, hole insert data for the plurality of hole inserts where the hole insert data for each of the plurality of hole inserts includes one or more of an insert length and the insert threaded length.

13. The computer system as recited in claim 12, where the instructions further include:

receiving, at the computer, hole depth data, where the fastener data and the hole insert received are dimensionally compatible with the hole depth data.

14. The computer system as recited in claim 12, where the instructions further include:

determining a percentage extension of the locking insert beyond the insert threaded length, and where selecting the optimum fastener and the optimum hole insert combination also provides a lowest percentage of the extension beyond the insert length of the locking insert when each of the plurality of fasteners is fully screwed into one of the plurality of hole inserts for the optimum fastener and the optimum hole insert combination that improves vibration characteristics to minimize susceptibility to vibration.

15. The computer system as recited in claim 12, where the instructions further include:

receiving, at the computer, design parameter data for a specific application where the design parameter data includes one or more of a material type, a tensile strength, and a number of threads per pitch;

receiving, at the computer, material property data for the plurality of fasteners and the plurality of hole inserts where the material property data includes one or more of tensile strength, coating, and heat treatment; and removing a portion of the plurality of fasteners and a portion of the plurality of hole inserts based on not meeting a constraint of one or more of the design parameter data and the material property data, and restricting the step of selecting the optimum fastener to selecting the optimum fastener from only a remaining portion of the plurality of fasteners.

16. The computer system as recited in claim 12, where the instructions for selecting the optimum fastener and the optimum hole insert combination include:

implementing one or more global optimization techniques in parallel and converging to no more than a predetermined set of best fastener and hole insert combinations, which meet the constraint of one or more of the design parameter data and the material property data.

17. The computer system as recited in claim 12, where the instructions further include:

implementing a local optimization technique on the predetermined set of best fastener and hole insert combinations and determining a global minimum.

18. The computer system as recited in claim 17, where the instructions for selecting the optimum fastener and the optimum hole insert combination that provides the greatest percentage overlap and a lowest percentage of the extension beyond the insert length of the locking insert includes receiving, at the computer, washer thickness data for a plurality of washers used in combination with each of the plurality of fasteners.

19. The computer system as recited in claim 18, where the instructions further include:

flagging fasteners and hole inserts for removal from inventory based on not meeting the design parameter data and the material property data constraints.

20. The computer system as recited in claim 19, where the instructions further include:

outputting a list of the predetermined set of best fastener and hole insert combinations and the global minimum to a medium readable by a human user.

21. A non-transitory computer readable storage medium for use in conjunction with a computer, the computer readable storage medium storing one or more programs including instructions for execution by the computer, the one or more programs when executed by the computer cause the computer to perform operations comprising:

determining a percentage overlap between a fastener locking insert and an insert threaded length for each combination of a plurality of fasteners and a plurality of hole inserts, selecting an optimum fastener and an optimum hole insert combination that provides a greatest percentage overlap, and causing two members to be attached together using the optimum fastener and the optimum hole insert combination.

22. The non-transitory computer readable storage medium as recited in claim 21, where the operations further comprise:

receiving, at the computer, fastener data for the plurality of fasteners where the fastener data for each of the plurality of fasteners includes data for one or more of a fastener length, a flange thickness and a start dimension for the fastener locking insert and an end dimension for the fastener locking insert where the start dimension and the end dimension are with respect to a leading end of each fastener; and receiving, at the computer, hole insert data for the plurality of hole inserts where the hole insert data for each of the plurality of hole inserts includes one or more of an insert length and the insert threaded length.

23. The non-transitory computer readable storage medium as recited in claim 22, where the operations further comprise:

receiving, at the computer, hole depth data, where the fastener data and the hole insert received are dimensionally compatible with the hole depth data.

24. The non-transitory computer readable storage medium as recited in claim 22, where the operations further comprise:

determining a percentage extension of the locking insert beyond the insert threaded length, and where selecting the optimum fastener and the optimum hole insert combination also provides a lowest percentage of the extension beyond the insert length of the locking insert when each of the plurality of fasteners is fully screwed into one of the plurality of hole inserts for the optimum fastener and the optimum hole insert combination that improves vibration characteristics to minimize susceptibility to vibration.

25. The non-transitory computer readable storage medium as recited in claim 22, where the operations further comprise:

receiving, at the computer, design parameter data for a specific application where the design parameter data includes one or more of a material type, a tensile strength, and a number of threads per pitch;

receiving, at the computer, material property data for the plurality of fasteners and the plurality of hole inserts where the material property data includes one or more of tensile strength, coating, and heat treatment; and removing a portion of the plurality of fasteners and a portion of the plurality of hole inserts based on not meeting a constraint of one or more of the design parameter data and the material property data, and restricting the selecting the optimum fastener to selecting the optimum fastener from only a remaining portion of the plurality of fasteners.

26. The non-transitory computer readable storage medium as recited in claim 22, where the operation of selecting the optimum fastener and the optimum hole insert combination that provides the greatest percentage overlap and a lowest percentage of the extension beyond the insert length includes receiving, at the computer, washer thickness data for a plurality of washers used in combination with each of the plurality of fasteners.

27. The non-transitory computer readable storage medium as recited in claim 22, where the operations further comprise:

implementing one or more global optimization techniques in parallel and converging to no more than a predetermined set of best fastener and hole insert combinations, which meet the constraint of one or more of the design parameter data and the material property data.

28. The non-transitory computer readable storage medium as recited in claim 27, where the operations further comprise:

implementing a local optimization technique on the predetermined set of best fastener and hole insert combinations and determining a global minimum.

29. The non-transitory computer readable storage medium as recited in claim 28, where the operations further comprise:

flagging fasteners and hole inserts for removal from inventory based on not meeting the constraint of the design parameter data and the material property data.

30. The non-transitory computer readable storage medium as recited in claim 29, where the operations further comprise:

outputting a list of the predetermined set of best fastener and hole insert combinations and the global minimum to a medium readable by a human user.

\* \* \* \* \*